United States Patent [19]

Soldavini

[11] Patent Number: 5,909,796
[45] Date of Patent: Jun. 8, 1999

[54] METHOD AND APPARATUS FOR LOADING ARTICLES ONTO VERTICALLY SPACED PLATFORMS OF A MOVING TRANSPORT DEVICE

[75] Inventor: Attilio Soldavini, Ferno-Va, Italy

[73] Assignee: Sandvik AB, Sandviken, Sweden

[21] Appl. No.: 08/748,904

[22] Filed: Nov. 15, 1996

[30] Foreign Application Priority Data

Nov. 16, 1995 [IT] Italy .................................. MI95A2359

[51] Int. Cl.⁶ ............................................. B65G 47/52
[52] U.S. Cl. ..................... 198/369.2; 198/435; 198/436
[58] Field of Search ................................ 198/369.2, 435, 198/436, 437

[56] References Cited

U.S. PATENT DOCUMENTS

| | | | |
|---|---|---|---|
| 3,404,775 | 10/1968 | McClellan | 198/369.2 |
| 3,494,455 | 2/1970 | Sarring | 198/436 |
| 3,640,372 | 2/1972 | Sarring | 198/436 |
| 4,166,525 | 9/1979 | Bruno | 198/369.2 |
| 4,852,715 | 8/1989 | Kmetz | 198/369.2 |
| 5,042,667 | 8/1991 | Keough | 209/3.1 |
| 5,287,952 | 2/1994 | Redaelli | 198/369.2 |
| 5,671,837 | 9/1997 | Tazou et al. | 198/369.2 |

FOREIGN PATENT DOCUMENTS

| | | |
|---|---|---|
| 0 343 613 | 11/1989 | European Pat. Off. . |
| 2025882 | 1/1980 | United Kingdom . |
| 2111933 | 7/1983 | United Kingdom . |

*Primary Examiner*—David A. Bucci
*Assistant Examiner*—Steven B. McAllister
*Attorney, Agent, or Firm*—Burns, Doane, Swecker & Mathis, L.L.P.

[57] ABSTRACT

A loading station of a high-speed, high volume conveying/sorting mechanism feeds coded articles selectively onto upper and lower platforms of a mobile transport device. The loading station includes a pivotable introduction conveyor which feeds articles selectively to a pivotable upper loading conveyor or a non-pivotable lower loading conveyor. When an article is to be fed to the upper platform, the discharge end of the introduction conveyor is swung upwardly, and the inlet end of the upper loading conveyor is swung downwardly so that those conveyors are aligned in an upwardly inclined direction toward the upper platform. When an article is to be fed to the lower platform, the discharge end of the introduction conveyor is swung downwardly so as to be in alignment with the lower loading conveyor which is inclined downwardly toward the lower platform, and the inlet end of the upper loading conveyor is simultaneously swung upwardly so that the upper loading conveyor is inclined downwardly toward the upper platform.

10 Claims, 2 Drawing Sheets

METHOD AND APPARATUS FOR LOADING ARTICLES ONTO VERTICALLY SPACED PLATFORMS OF A MOVING TRANSPORT DEVICE

BACKGROUND OF THE INVENTION

The invention relates to the high-speed, high-volume conveying of small articles which are to be sorted by being conveyed from a loading station to one of a number of collecting stations disposed along a conveying path. In particular, the invention relates to the loading station.

Such a conveying/sorting apparatus is used to sort articles such as packages in mail-order facilities and courier services, for example. The apparatus typically includes a rail which defines the conveying path, and a number of transport devices which travel along the rail between the loading and collecting stations. Each transport device includes a platform, such as a driven endless belt, which receives articles at the loading station and discharges them onto collection devices at respective collection stations.

Various types of conveying/sorting machines are known; in particular, commonly owned patent GB 2,111,933, relates to a sorting plant which comprises a number of transport devices or trucks, each having a rotation apron or belt constituting an article transport and unloading platform. The trucks move along a fixed route lined with containers designed to collect, and thereby sort, the articles. The articles, suitably coded on the basis of their destination, are loaded into individual cells in a loading station where sensing devices (e.g., scanners) check the type of parcel (size, weight, etc.), match each parcel with a transport platform, and load the articles into respective trucks passing through the loading station. The articles are actually introduced into the transport platforms by means of loading conveyor units which are suitably synchronized and controlled in terms of both speed and acceleration in order to produce precise movement of the articles. Such loading units are also known, being described in commonly owned patent EP 0 343 613.

Developments in the technology and the application of sophisticated types of electronic apparatus for the management of these plants have produced a considerable increase in productivity, with the result that a plant with some 300–400 transport platforms can sort over 10,000 objects an hour.

However, users' requirements have kept pace with developments in the technology, and increasingly precise units with higher productivity are required. A particularly interesting way of obtaining a high-productivity plant with a large number of outputs is to construct a conveying/sorting apparatus in which each transport device carries vertically superimposed transport platforms in the form of rotating aprons, each of which is loaded with an article to be sorted along the conveying route. The collection devices are also installed on two levels, at the respective heights of the aprons, as disclosed in commonly owned, concurrently filed, U.S. application Ser. No. 08/749,230, of Tacchi the disclosure of which is incorporated by reference herein.

That dual-platform system enables twice the number of articles to be handled in a given period of time without increasing the number of conveyor trucks or the size of the plant. However, it poses the problem of how to load the articles onto transport platforms disposed at different levels without requiring separate loading stations, one for each level, and without having to make extensive, costly modifications to the structure of the plant.

SUMMARY OF THE INVENTION

To solve that problem, this invention involves a loading unit for loading articles onto a transport device having transport platforms located on two levels. The loading unit comprises a pair of driven loading aprons located at the levels of respective transport platforms, at least one of the aprons being a rocking apron. A third, introduction rocking apron receives the articles from the coding station and routes them towards either of the loading aprons for loading onto the upper or lower platform of the transport device. A mechanism controls the oscillations of the two rocking aprons. The aprons are continually driven, and the rocking aprons oscillate while the articles are being fed towards them, to allow for more rapid loading. This offers various advantages, especially higher speed than known loading units and greater balance of the moving masses, with a reduction in the extent of the movements compared with known loading units.

BRIEF DESCRIPTION OF THE DRAWING

A preferred embodiment of the invention will now be described in detail, by way of example but not of limitation, with reference to the annexed figures in which.

DETAILED DESCRIPTION OF A PREFERRED EMBODIMENT OF THE INVENTION

Figure 1:
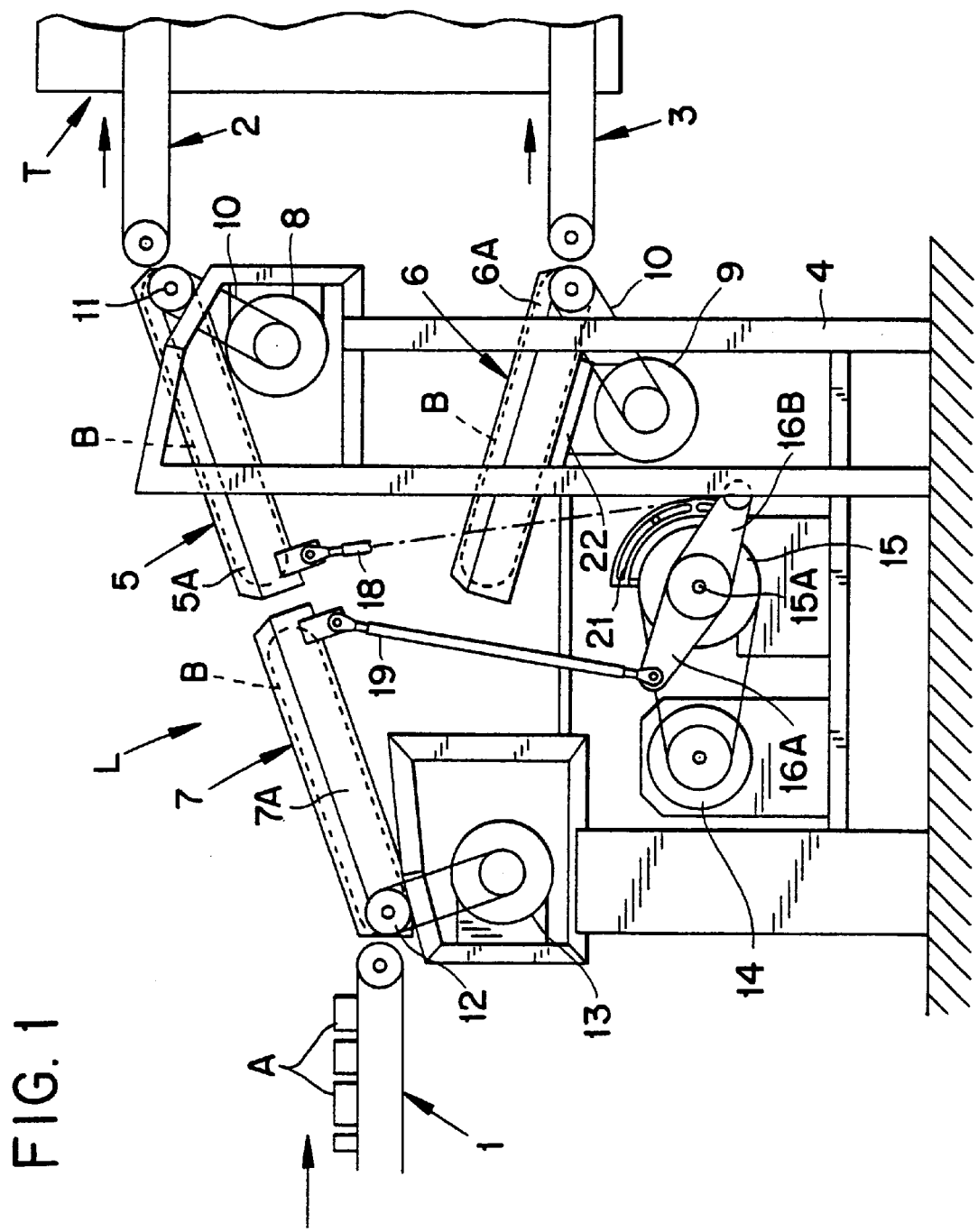
FIG. 1 schematically illustrates a side view of a loading unit in accordance with the invention, in a position in which articles are loaded onto an upper transport platform.

In FIG. 1, there is depicted a conveyor belt 1 which conveys articles from a coding station to a loading unit L which, in turn, loads the articles onto respective upper and lower superimposed transport platforms 2, 3 of a transport device T. As explained earlier herein, such a transport device T travels along a path and discharges the articles at respective unloading stations disposed along the path.

The loading unit L comprises a support frame 4 on which are mounted two rotating aprons or belts 5 and 6, subsequently called "loading aprons," and a third rotating apron 7, subsequently called the "introduction apron." Each of the aprons 5, 6, 7 comprises a support 5A, 6A, 7A on which the actual apron or belt B is mounted.

The discharge ends of the upper and lower loading aprons 5 and 6 are located at respective levels corresponding to those of the transport platforms 2 and 3, respectively, and the belts B are driven by respective electric motors 8 and 9 which constantly rotate them via toothed belts 10 or the like.

The support 6A of apron 6 is seated on a fixed frame 22 which is aligned with an imaginary line extending from an inlet end of the transport platform 3 to the discharge end of the conveyor belt 1.

The upper loading apron 5 is a rocking apron, because its support 5A can rotate around a horizontal shaft 11 to move its inlet end (i.e., the left-hand end) between lower and raised positions. In the lower position, illustrated in FIG. 1, the apron B thereof is aligned with an imaginary line extending from the inlet end of the upper transport platform 2 to the discharge end of the conveyor belt 1. The apron 5 is moved to the raised position illustrated in FIG. 2, by having its inlet end raised.

The inlet end of the introduction apron 7 is hinged to a shaft 12 located at the level of the discharge end of conveyor belt 1, and its belt is driven constantly by an electric motor 13. The inlet end of the introduction apron lies on a horizontal plane disposed substantially midway between the discharge ends of the loading aprons 5, 6.

Figure 2:
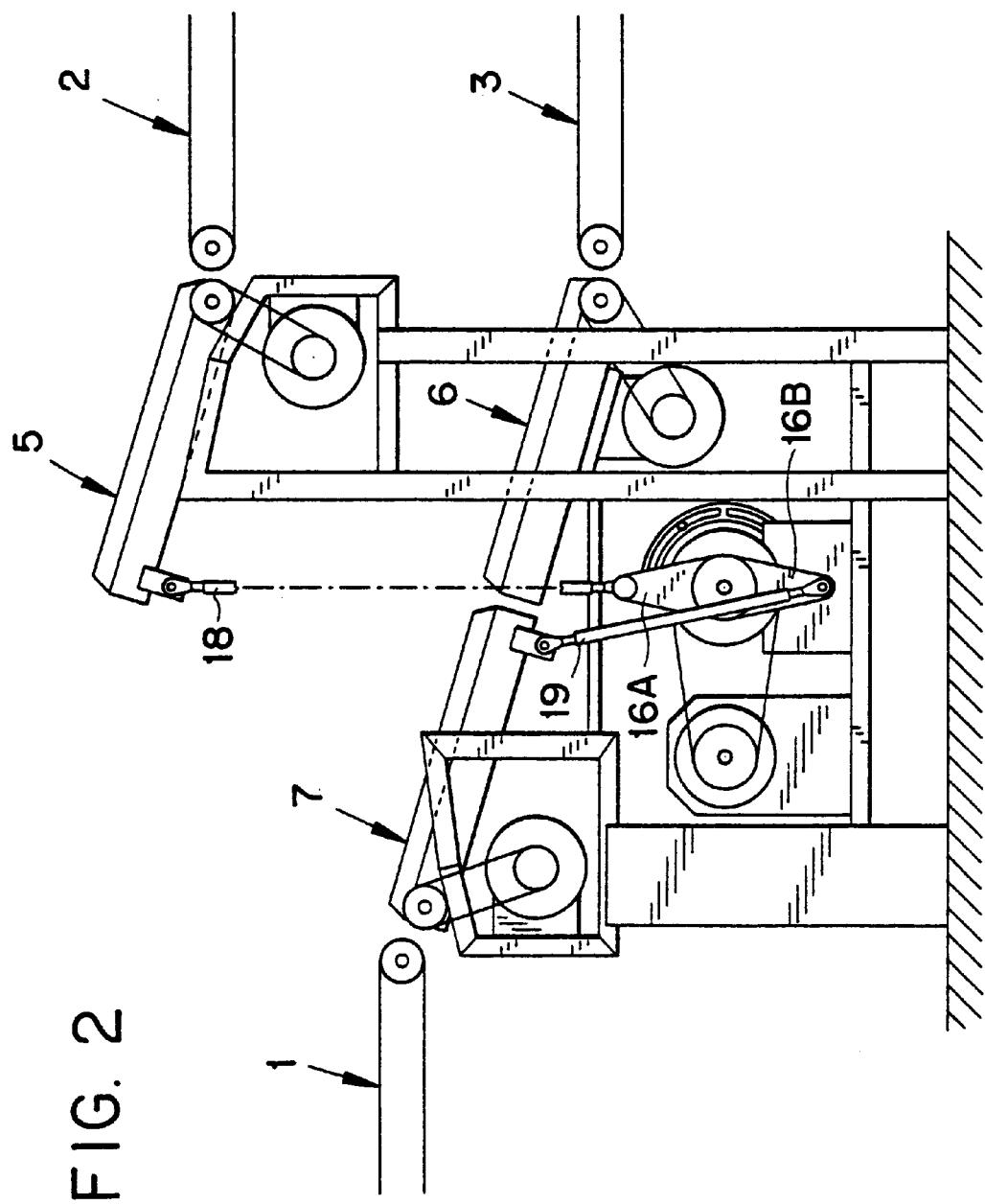
FIG. 2 schematically illustrates a side view of the loading unit in a position in which articles are loaded onto a lower transport platform.

The introduction apron 7 is a rocking apron because it can move from a first position in which it is aligned with the upper loading apron 5 (FIG. 1) to a second position in which it is aligned with the lower loading apron 6 (FIG. 2).

The rocking or oscillation of aprons 5 and 7 is controlled by an electric motor 14, preferably of the brushless type, which rotates a pulley 15 that is connected to a pair of arms 16A, 16B in order to oscillate those arms about an axis 15A. The arms 16A, 16B are connected via connecting rods 19 and 18 to the inlet end of apron 5 and the discharge end of apron 7, respectively. During the operation of the conveying/sorting apparatus, the articles A arriving from the coding station are regularly conveyed by conveyor belt 1, which transfers them to the introduction apron 7.

When the introduction apron 7 receives an article, it passes it to either the upper loading apron 5 or the lower loading apron 6, depending on the destination of the article, for loading the article onto upper platform 2 or lower platform 3. The lower loading apron 6 is fixed in a position inclined toward its discharge end. When the rocking discharge end of the introduction apron 7 is in its lower position, it is disposed adjacent the inlet end of the lower loading apron, and the introduction apron 7 is generally aligned with the lower loading apron 6. Thus, an article can be fed to the lower loading apron.

When the rocking inlet end of the upper loading apron 5 is in its lower position, the following conditions exist:

(i) the upper loading apron 5 is inclined upwardly toward its discharge end, (ii) the introduction apron 7 is generally aligned with the upper loading apron 5, and (iii) the rocking discharge end of the introduction apron 7 is disposed adjacent the rocking inlet end of the upper loading apron 5.

Hence, articles can be fed to the upper loading apron 5.

When the rocking inlet end of the upper loading apron is in its upper position, the introduction apron 7 is generally aligned with the lower loading apron 6, and the upper loading apron 5 is inclined downwardly toward its discharge end substantially parallel to the lower loading apron 6, in order to facilitate conveyance of the article.

On the basis of the destination of the article, and therefore, the transport platform assigned to it at the time of coding, the electronic devices governing the management of the entire plant activate the motor 15 to rotate arms 16A, 16B and thus re-position the aprons 5 and 7 via connecting rods 18 and 19 so that the aprons 5, 7 are either: (i) aligned with one another to direct the article to the upper transport platform 2 as shown in FIG. 1, or (ii) non-aligned as illustrated in FIG. 2 wherein the introduction apron 7 is aligned with the fixed loading apron 6 to direct the article onto the lower transport platform 3. The lengths of arms 16A, 16B are calculated to produce the required movement of aprons 5 and 7 without the connecting rods 18 and 19 reaching a dead center position. Motor 14 is stopped by electronic devices of a known type when the introduction apron 7 is aligned with the respective loading apron 5 or 6, the devices receiving a signal indicating the position of arms 16A, 16B with respect to a proximity sensor 20, which is mounted adjustably to a guide 21. The configuration described offers considerable advantages over known units, especially as regards the speed of the apparatus.

The two loading aprons 5, 6 divide the articles among one another, i.e., one loading apron can receive an article while the other loading apron is delivering an article to the transport device. Thus, loading occurs much more rapidly than would be the case, for example, if instead of using loading aprons 5, 6, the transport platforms 2, 3 received articles directly from the rocking apron 7.

In addition, the moving parts are dynamically balanced, with all the resulting advantages. The high positioning speed of aprons 5 and 7 enables these movements to be performed while articles are being conveyed thereon. Also, articles can be conveyed along the upper and lower aprons while the next transport device is being brought into position. Thus, the invention minimizes article loading time, so that the unit in accordance with the invention is easily able to adequately serve machines moving at high speed.

An artisan in the field could devise numerous modifications and variations which fall within the scope of this invention.

What is claimed:

1. A loading unit for loading articles selectively onto upper and lower platforms, comprising:

an introduction apron including a support and a driven endless belt mounted thereon; said introduction apron including an inlet end for receiving articles fed thereto, and a rocking discharge end for discharging the articles; said introduction apron being mounted adjacent its inlet end for pivoting about a horizontal axis to enable said rocking discharge end to move between upper and lower positions;

a lower loading apron including a support and a driven endless belt mounted thereon; said lower loading apron including an inlet end arranged adjacent said discharge end of said introduction apron when said discharge end is in said lower position, for receiving articles therefrom; said lower loading apron including a discharge end for discharging articles onto a lower platform; and an upper loading apron including a support and a driven endless belt mounted thereon; said upper loading apron including a rocking inlet end and an outlet end for discharging articles onto an upper platform; said upper loading apron being mounted adjacent its discharge end for pivoting about a horizontal axis to enable said rocking inlet end to move between upper and lower positions; and a rocking mechanism operably connected to said introduction apron and said upper loading apron for pivoting said introduction apron and said upper loading apron together such that when said rocking inlet end is in its lower position, said rocking discharge end is disposed in its upper position and adjacent said rocking inlet end for delivering articles thereto, said rocking mechanism comprising a motor, a shaft oscillated by said motor, first and second arms fixed to said shaft, each arm having a free end, and first and second rods, said first rod connected between said rocking discharge end and said free end of said first arm, said second rod connected between said rocking inlet end and said free end of said second arm.

2. The loading unit according to claim 1, wherein said lower loading apron is inclined downwardly from its inlet end to its discharge end; said introduction apron being generally aligned with said lower loading apron when said rocking discharge end is in its lower position.

3. The loading unit according to claim 2, wherein when said rocking inlet end is in its lower position, said upper loading apron is inclined upwardly toward its discharge end, and said introduction apron is generally aligned with said upper loading apron.

4. The loading unit according to claim 3, wherein said inlet end of said introduction apron lies on a horizontal plane disposed substantially midway between said discharge ends of said upper and lower discharge aprons.

5. The loading unit according to claim 3, wherein said upper unit is inclined downwardly toward its discharge end when said rocking inlet end is in its upper position.

6. The loading unit according to claim 1, further including a sensor for detecting positions of said rods and for shutting off said motor when said rods are in selected positions.

7. The loading unit according to claim 6, wherein the sensor is a proximity sensor.

8. In a conveying/sorting apparatus comprising a transport device movable along a path for transporting articles from a loading unit to respective collection stations disposed along the path, the transport device including upper and lower driven endless transport belts having respective inlet ends for receiving and conveying respective articles, the articles being fed to the loading unit by a feed conveyor, the articles being coded as to destination and fed to the upper or lower transport belt on the basis of such destination, the improvement wherein the loading unit comprises:

a lower loading apron comprising a fixedly mounted support and a driven endless belt mounted thereon, said lower loading apron having an inlet end, and a discharge end disposed adjacent said inlet end of said lower transport belt and in general alignment therewith, whereby said lower loading apron transfers articles to the lower transport belt, said lower loading apron inclined downwardly toward said inlet end of said lower transport belt;

an upper loading apron comprising a support and a driven endless belt mounted thereon, said upper loading apron having an inlet end and a discharge end disposed adjacent said inlet end of said upper transport belt and in general alignment therewith, whereby said upper loading apron transfers articles to the upper transport belt, said upper loading apron being pivotably mounted about a horizontal axis adjacent its discharge end whereby its inlet end constitutes a rocking inlet end movable between upper and lower positions;

an introduction apron comprising a support and driven endless belt mounted thereon, said introduction apron including an inlet end disposed adjacent said feed conveyor and lying on a horizontal plane spaced above said discharge end of said lower loading apron and below said discharge end of said upper loading apron, said introduction apron being pivotably mounted adjacent said inlet end thereof such that said discharge end thereof constitutes a rocking discharge end movable between upper and lower positions; and a rocking mechanism for selectively establishing first and second feed relationships between said introduction apron and said upper and lower loading aprons, said rocking mechanism operably connected to said introduction apron and said upper loading conveyor for pivoting said introduction apron and said upper loading apron simultaneously into general alignment in a direction inclined upwardly toward said inlet end of said upper transport belt to define said first feed relationship, and for pivoting said introduction apron into general alignment with said lower loading apron while simultaneously pivoting said rocking inlet end upwardly to define said second feed relationship.

9. The apparatus according to claim 8, wherein said upper loading apron is inclined downwardly toward said upper platform when in said second feed relationship.

10. The apparatus according to claim 8, wherein said rocking mechanism comprises a motor, a shaft oscillated by said motor, first and second arms fixed to said shaft, each arm having a free end, and first and second rods, said first rod connectd between said rocking discharge end and said free end of said first arm; and second rod connected between said rocking inlet end and said free end of said second arm.

\* \* \* \* \*